G. A. ANDERSON.
CAR TRUCK.
APPLICATION FILED JAN. 23, 1922.
1,414,922.
Patented May 2, 1922.
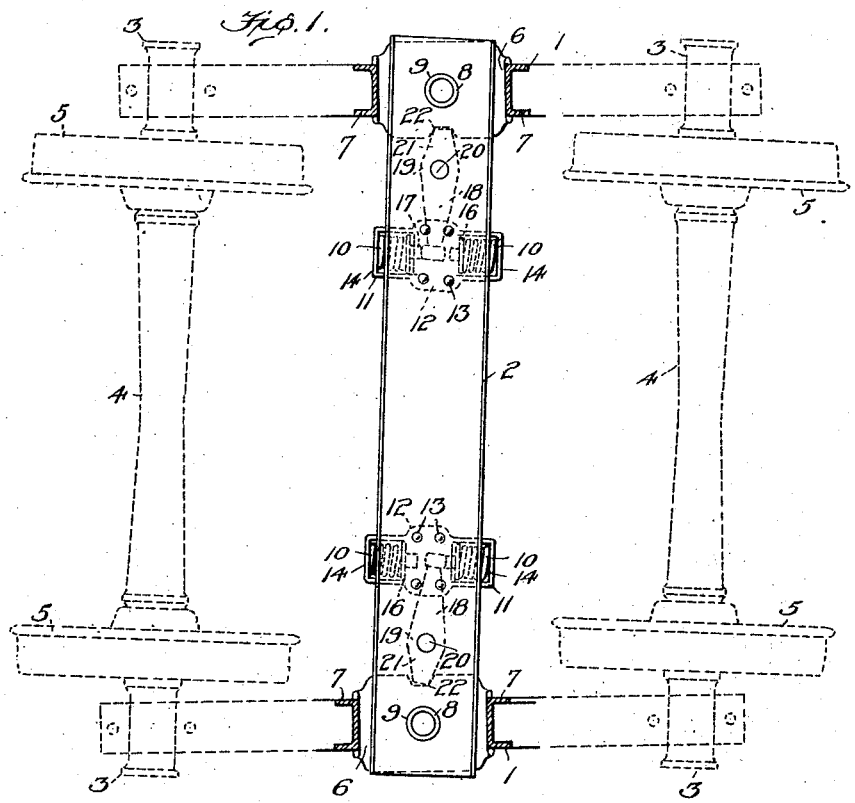
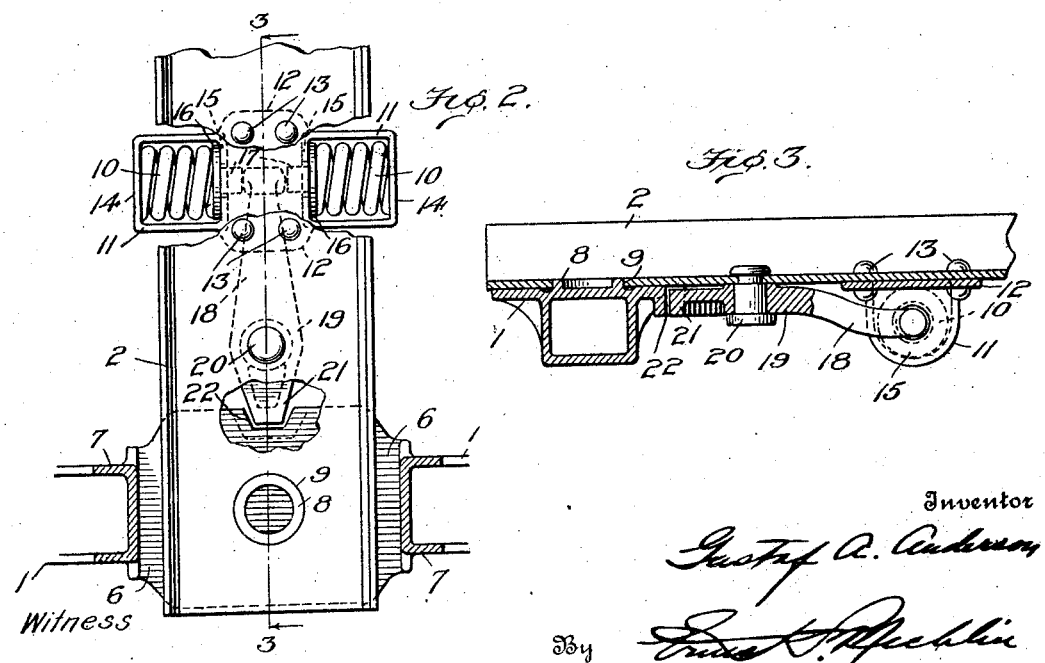
Witness
Edwin L. Bradford
Inventor
Gustaf A. Anderson
By
his Attorney

UNITED STATES PATENT OFFICE.

GUSTAF A. ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,922.   Specification of Letters Patent.   Patented May 2, 1922.

Application filed January 23, 1922. Serial No. 531,245.

*To all whom it may concern:*

Be it known that I, GUSTAF A. ANDERSON, a citizen of the United States, residing at the city of Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks and more particularly stated, embodies a truck squaring mechanism included within and operatively controlled by the displacement movement of the side frame members of the truck.

In car trucks of the flexible type, means is provided for permitting temporary displacement of the truck so as to assume an outer square relation allowing the truck parts to be relieved from the deteriorating and destructive effects of forces or blows applied to the truck as an incident of its passage around curves and as the result of inequalities in the track, such as projecting switch points, bad rail joints, or other imperfections in the track or truck wheels.

The principal objects of my invention are to provide yieldable mechanism capable of restoring the side frame truck members and associated parts to normal square position, and to effectively cushion the displacement shock.

In my present embodiment these objects are accomplished by providing yieldable means including a lever, said lever being mounted upon the means connecting the side frame members and having one end arranged to engage and energize spring devices in said yielding means when receiving a cushioning or displacement shock, and the other end of said lever being adapted to be actuated by the displacement movement of the truck side frame member from normal position.

Broadly regarded however, the restoring and cushioning actions of the truck squaring mechanism are obtained by transmitting the displacement and restoration movements through an interposed lever.

Other advantages of the invention are to be found in the simple, strong and compact arrangement of the parts as will hereinafter appear.

In the drawings wherein is illustrated an embodiment of the invention the scope whereof is pointed out in the claims, Figure 1 is a view of my invention incorporated within a car truck, fragmentarily illustrated, the parts being shown in the angular relations they assume when passing around a curve;

Figure 2 is a detail plan view of the parts broken away to illustrate the relation of the lever as carried by the side frame members connecting means, and interposed between the yieldable spring means and one of the side frame members, the parts being in their normal square position; and Figure 3 is a vertical sectional view on the line 3—3 of Figure 2.

In the car truck shown in the drawings the spaced side frame members 1 are normally connected by transversely extending means 2 which is preferably the truck spring plank. Each side frame is provided at its opposite ends with journal boxes (not shown) into which extend the journal ends 3 of axle 4 carrying truck wheels 5.

The means 2 connecting the side frame members 1 extends transversely across the truck and the ends thereof preferably extend into the bolster openings 6 between the columns 7, the space between the columns being sufficiently large to permit said connecting means to turn through the required angle corresponding to the relative displacement movement from normal position which the side frame members 1 may be designed to have. When, as in the present case, the spring plank is used to function as a cross connecting member, sufficient clearance is similarly provided for permitting the bolster to change its angular relation to the side frame members when the latter execute relative longitudinal movement of the truck.

The spring plank connecting means 2 is pivotally attached to each side frame member 1, a pivot boss 8 extending upwardly from each side frame and entering a correspondingly shaped opening or pivot bearing 9 in each end of the spring plank.

The yieldable mechanism for restoring the side frame members to normal square position includes in the embodiment shown spring resisting and cushioning devices capable of effectively resisting the displacement movement of the side frame members and absorb such shocks or blows as may be transmitted to the truck. The displacement movement of the side frame members 1 serves to energize the spring devices. It will be obvious, however, that the duty of yieldingly restraining longitudinal and other departure of the side frame members 1 from their normal square position may be performed by a single yieldable mechanism or spring device, since the restoration of the cross connecting member 2 to normal position, even though enforced by a single spring device, will result in the return of both side frames to square position. I prefer, however, to locate oppositely disposed yieldable means near the ends of and beneath the spring plank, arranging said means wholly within the truck and adjacent the respective side frame members for co-operation therewith. Each yieldable means or spring device includes spaced springs 10—10 positioned within suitable cages or pockets 11 attached to the spring plank 2. If desired, the springs may be assembled and positioned under considerable initial compression. The pockets 11 are preferably formed integral with a plate section 12 secured to the spring plank 2 by means of rivets 13. Each pocket is formed at its opposite ends with spring abutments or shoulders 14—14 and 15—15, respectively. The springs 10 operate between the said abutments. A follower 16 is associated with each spring and is interposed between the inner abutment 15 and said spring, as best shown in Fig. 2.

Each follower 16 is provided with an extension 17 sufficiently long to project through an opening in the abutment wall 15 for cooperation with one arm 18 of the lever 19.

The lever 19 is included in the spring yielding means and is interposed between the spring device and the side frame member of the truck. A single lever may be employed sufficient to transmit the displacement movement to the spring resisting device and the restoring movement to the side frame members, but in the present embodiment I prefer to employ a lever for each yielding device, as shown.

Each lever 19 is pivotally mounted on the spring plank 2 at 20, the pivotal points 20 of said levers being on a line passing transversely of the truck and through the pivot bosses 8 of the side frame members. A relatively short arm 21 is included in each lever, the end of said arm forming a nose operatively interconnected with the side frame member. Each side frame member 1 is formed with a recess 22 for the reception of the end of the lever arm 21, there being sufficient looseness provided in this connection to permit free and efficient action of the interconnected parts.

In the present case the straight side faces of the lever arm 21 receive the impact from the respective coacting side walls of the recess 22. This forms a simple, strong and altogether responsive connection between the yielding mechanism and side frame member. The opposite arms 18 of the respective levers 19 are relatively long and the ends thereof project between the opposed extensions 17 of the followers 16. In normally square position of the truck, the levers 19 are preferably in alinement, that is a line passing through the pivotal points 20 of said levers and the pivot bosses 8 will equally divide the levers. The springs 10 press the follower extensions 17 into relatively close position and substantially against the opposite sides of the lever arm 18, thereby serving to maintain normal straight position of each lever. In some cases the extensions 17 may be slightly lengthened so as to yieldingly bear against the sides of the lever arm 18, thereby maintaining the lever in suspended spring or yielding relation.

A truck including a squaring mechanism of the construction described will operate in the following manner when either or both of the side frame members 1 become displaced from their normal positions. This displacement is generally longitudinally of the truck, although it will be obvious that any other independent movement of the side frame members will cause the mechanism to operate to restore the truck to normally square position. The relative displacement movement of the side frames causes the transverse connecting means 2 to change its angular relation to said side frames, as illustrated in Fig. 1. When this occurs the side frame members bear against the respective arms 21 of the levers 22, and said levers are thereby swung upon the pivots 20 which latter, while maintaining their relatively fixed alinement with the pivot bosses 8, are also swung out of a true perpendicular position which they normally occupy with respect to the side frame members.

The movement of the arm 21 of each lever produces a relatively longer movement of the lever arm 18. The end of the lever arm 18 presses against the extension 17 of the follower and energizes the spring 10. The displacement shock is cushioned as a result of the lever transmitting the movement of the side frame members to the spring devices. When the force acting upon the truck to induce relative longitudinal displacement of the side frames from their normal position ceases to act the springs 10, which have been materially energized or compressed, thereupon expand and in so doing force the longer arm of the lever 18 into straight position, thereby rocking the lever 19 upon its pivot point 20, causing the shorter arm 21 to force the side frame members into normal square position.

If the side frame members of the truck are forced out of square position in a direction opposite to that shown in the drawings, the oppositely disposed springs 10 will receive the displacement shock and become energized for purposes of restoring the said side frames to normally square position.

The length and location of the lever 19 upon the connecting means 2 and the relative proportions of the long and short arms of said lever may be varied to effectively transmit the displacement and restoring movements. It will also be understood that the cross-connecting means 2 need not necessarily be the spring plank, or the bolster, but may be either a part capable of performing the functions of such elements, or a connection independent thereof.

I claim:—

1. In a car truck, the combination with side frame members which are relatively movable longitudinally of the truck, of means connecting said side frame members, and yieldable means interposed between said side frame members and connecting means, said yieldable means including a lever arranged between one of said side frame members and said yielding means for energizing the latter.

2. In a car truck, the combination with independently movable side frame members, of means connecting said side frame members, and yieldable means interposed between said connecting means and said side frame members for resisting displacement of the side frame members from normal position, said yieldable means including a lever having one end arranged to engage the said yielding means and the other end engaging one of the side frame members.

3. In a car truck, the combination with independently movable side frame members, of means connecting said side frame members, and yieldable means interposed between said connecting means and the side frame members for resisting displacement of the side frame members from normal position, said yieldable means including a lever pivotally mounted upon said connecting means and actuated by one of the side frame members for energizing the said yieldable means.

4. In a car truck, the combination with independently movable side frame members, of means connecting said side frame members, and yieldable means interposed between said connecting means and the side frame members for resisting displacement of the side frame members from normal position, said yieldable means including a lever operably associated with said yieldable means and actuated by one of the side frame members for energizing the said yieldable means.

5. In a car truck, the combination with independently movable side frame members, of means connecting said side frame members, and yieldable means interposed between said connecting means and the side frame members for resisting displacement of the side frame members from normal position, said yieldable means including a lever pivotally mounted between the side frame members and their connecting means, said lever being actuated by one of the side frame members for energizing the said yieldable means.

6. In a car truck, the combination with independently movable side frame members, of means connecting said side frame members, and yieldable means interposed between said connecting means and the side frame members for resisting displacement of the side frame members from normal position, said yieldable means including a lever pivotally mounted upon the lower side of the said means connecting the side frame members and actuated by one of the side frame members for energizing the said yieldable means.

7. In a car truck, the combination with independently movable side frame members, of means connecting said side frame members, and yieldable means interposed between said connecting means and the side frame members for resisting displacement of the side frame members from normal position, said yieldable means including a plurality of levers pivotally mounted upon the said means connecting the side frame members and actuated by the side frame members for energizing the said yieldable means.

8. In a car truck, the combination with independently movable side frame members, of means pivotally connecting said side frame members, yieldable means for resisting displacement of the side frame members from normal position, and a lever pivotally mounted on said connecting means and having its pivot point in a line extending through the pivotal connections of said connecting means.

9. In a car truck, the combination with independently movable side frame members, of means pivotally connecting said side frame members, yieldable means for resisting displacement of the side frame members from normal position, and a plurality of oppositely disposed levers mounted on said connecting means and having their pivot points arranged in a line extending through the pivotal connections of said connecting means.

10. In a car truck, the combination with independently movable side frame members, of means pivotally connecting said side frame members, spaced spring devices for resisting displacement of the side frame members from normal position, and a lever having one end actuated by the side frame and the other end interposed between said spring devices for energizing the same.

11. In a car truck, the combination with independently movable side frame members, of means pivotally connecting said side frame members, oppositely disposed yielding means for resisting displacement of the side frame members from normal position, said yielding means including spaced spring devices mounted upon said connecting means, and levers pivoted to said connecting means and actuated by the side frame members for energizing either of said spaced spring devices according to the displacement of the side frame members.

12. In a car truck, the combination with independently movable side frame members, means for pivotally connecting said side frame members, a spring device for resisting displacement of the side frame members from normal position, and a lever having one end loosely engaging one of the side frame members and adapted to be actuated thereby upon displacement of said side frame members from normal position.

13. In a car truck, the combination with independently movable side frame members, a spring plank movably connecting said side frame members, a pocket in said spring plank and a spring device arranged therein for resisting displacement of the side frame members from normal position, a follower arranged to engage said spring device, and a lever pivoted to said spring plank and having one end arranged for engagement with the said follower and the other end adapted to be actuated by one of the side frame members.

14. In a car truck, the combination with independently movable oppositely disposed side frame members, a spring plank movably connected at each end to the oppositely disposed side frame members, a spring device arranged upon the underside of said spring plank for resisting displacement of the side frame members from normal position, and a lever mounted upon the underside of said spring plank having its pivotal point arranged in a line extending through the pivotal connections at each end of said spring plank, said lever being actuated upon displacement of one of the side frame members from normal position.

In testimony whereof I affix my signature

GUSTAF A. ANDERSON